(12) United States Patent
Okamoto et al.

(10) Patent No.: US 6,828,414 B2
(45) Date of Patent: Dec. 7, 2004

(54) PROCESS FOR PRODUCING AROMATIC POLYETHERS WITH HIGH MOLECULAR WEIGHTS

(75) Inventors: Kazushige Okamoto, Suita (JP); Kunihisa Satoh, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 61 days.

(21) Appl. No.: 10/237,887

(22) Filed: Sep. 10, 2002

(65) Prior Publication Data

US 2003/0114639 A1 Jun. 19, 2003

(30) Foreign Application Priority Data

Sep. 27, 2001 (JP) .......................... 2001-297062

(51) Int. Cl.[7] ................... C08G 65/34; C08G 75/20; C08G 75/23

(52) U.S. Cl. ................ 528/425; 528/86; 528/90; 528/102; 528/391; 528/487; 528/488

(58) Field of Search .................... 528/425, 86, 90, 528/102, 391, 487, 488

(56) References Cited

U.S. PATENT DOCUMENTS

| | | | |
|---|---|---|---|
| 5,212,264 A | 5/1993 | Hoffmann et al. | |
| 6,228,970 B1 | 5/2001 | Savariar | |
| 2002/0010307 A1 | 1/2002 | Schwab | |

FOREIGN PATENT DOCUMENTS

| | | |
|---|---|---|
| JP | 9-316189 A | 12/1997 |
| JP | 2002-220469 A | 8/2002 |

*Primary Examiner*—Duc Truong
(74) *Attorney, Agent, or Firm*—Sughrue Mion, PLLC

(57) ABSTRACT

A process for producing an aromatic polyether having a high molecular weight, small dispersion of the molecular weight, excellent in the heat resistance as well as the impact resistance and represented by the formula (1):

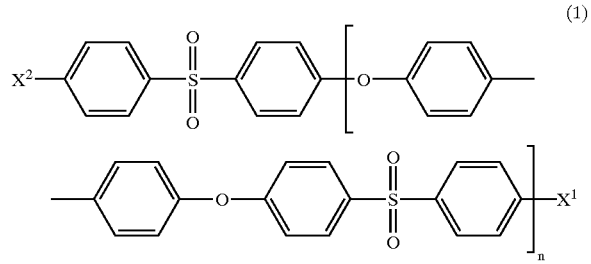

(1)

wherein each of $x^1$ and $x^2$ independently represents a halogen, and n represents an integer of 1 or above is provided, which comprises polymerizing 4,4'-biphenol with a 4,4'-dihalogenodiphenyl sulfone represented by the formula (2):

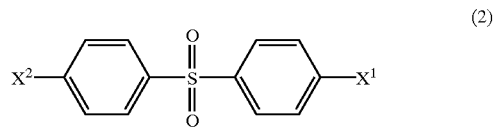

(2)

wherein $x^1$ and $x^2$ have the same meaning as above,
in an amount exceeding 1 time by mole and not exceeding 1.05 time by mole based on said 4,4'-biphenol
in diphenyl sulfone and
in the presence of an alkali metal carbonate and/or an alkali metal bicarbonate at a temperature which is not lower than 240° C. and not higher than 270° C.

4 Claims, No Drawings

PROCESS FOR PRODUCING AROMATIC POLYETHERS WITH HIGH MOLECULAR WEIGHTS

BACKGROUND OF THE INVENTION

1. Field of the Invention

The present invention relates to a process for producing an aromatic polyether obtainable by polymerizing a biphenol and a dihalogenodiphenyl sulfone in diphenyl sulfone in the presence of an alkali metal carbonate and/or an alkali metal bicarbonate.

2. Description of Related Art

Aromatic polyethers containing a repeating unit represented by the formula (1-1):

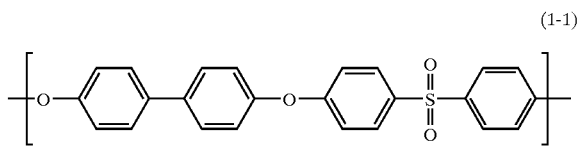

are useful as high molecular compounds superior in heat resistance, impact resistance and others. As processes for producing them, there have been known processes in which 4,4'-biphenol is polymerized with a 4,4'-dihalogenodiphenyl sulfone represented by the formula (2):

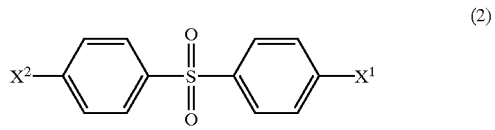

wherein each of $x^1$ and $x^2$ independently represents a halogen, in diphenyl sulfone and in the presence of an alkali metal carbonate and/or an alkali metal bicarbonate to produce an aromatic polyether represented by the formula (1):

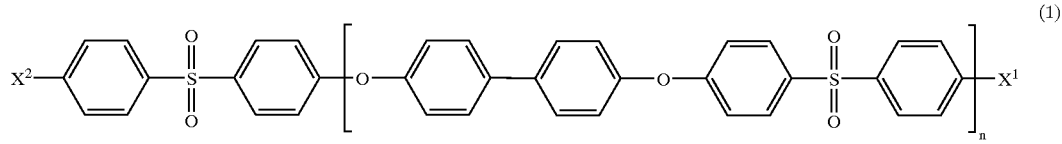

wherein each of $x^1$ and $x^2$ have the same meaning as above, and n represents an integer of 1 or above (JP-A-3-84032).

In the above process, when a 4,4'-dihalogenodiphenyl sulfone (2) is used in an amount exceeding 1 time by mole and not exceeding 1.05 time by mole, aromatic polyethers represented by the above formula (1) having a higher molecular weight, such as those having a weight-average molecular weight of 35,000 or more, can be obtained. However, although an aromatic polyether having such a desired high molecular weight can be obtained, a problem arises that the obtained aromatic polyether has a greater dispersion of molecular weight, which tends towards an inferior impact resistance.

An object of the present invention is to provide a process for producing an aromatic polyether having high molecular weight as well as small dispersion of molecular weight by polymerizing a biphenol with a dihalogenodiphenyl sulfone in diphenyl sulfone and in the presence of an alkali metal carbonate and/or an alkali metal bicarbonate.

Under these circumstances, the inventors have conducted an intensive research for developing a process which allows production of aromatic polyethers with a high molecular weight and a small dispersion of the molecular weight by polymerizing 4,4'-biphenol with a 4,4'-dihalogenodiphenyl sulfone in diphenyl sulfone and in the presence of an alkali metal carbonate and/or an alkali metal bicarbonate. As the result, they have found the fact that the above problems can be solved when the polymerization is carried out at a specific temperature. The inventors have further found that aromatic polyethers having improved transparency can be obtained in the above process by using hypophosphorous acid and/or its alkali metal salts. Thus, the present invention was completed.

SUMMARY OF THE INVENTION

Accordingly, the present invention provides a process for producing an aromatic polyether represented by the above formula (1) which comprises polymerizing 4,4'-biphenol with a 4,4'-dihalogenodiphenyl sulfone represented by the above formula (2)
in an amount exceeding 1 time by mole and not exceeding 1.05 time by mole based on said 4,4'-biphenol
in diphenyl sulfone and
in the presence of an alkali metal carbonate and/or an alkali metal bicarbonate
at a temperature which is not lower than 240° C. and not higher than 270° C.

The present invention further provides a process for producing an aromatic polyether represented by the above formula (1) which comprises polymerizing 4,4'-biphenol with a 4,4'-dihalogenodiphenyl sulfone represented by the above formula (2)
in an amount exceeding 1 time by mole and not exceeding 1.05 time by mole based on said 4,4'-biphenol
in diphenyl sulfone,
in the presence of an alkali metal carbonate and/or an alkali metal bicarbonate and
in the presence of hypophosphorous acid and/or its alkali metal salts in an amount exceeding 0.001 time by mole and not exceeding 0.006 time by mole based on said 4,4'-biphenol at a temperature which is not lower than 240° C. and not higher than 270° C.

DETAILED DESCRIPTION OF THE INVENTION 4,4'-Biphenol is a compound represented by the formula (3).

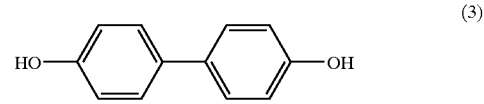

Examples of halogen represented by $x^1$ and $x^2$ in the formula (2) include fluorine, chlorine and bromine, and examples of such 4,4'-dihalogenodiphenyl sulfones include 4,4'-difluorodiphenyl sulfone, 4,4'-didichlorodiphenyl sulfone, 4,4'-dibromodiphenyl sulfone and the like.

The amount of these 4,4'-dihalogenodiphenyl sulfones to be used is 1 time by mole or more, preferably 1.01 time by mole or more, more preferably 1.02 time by mole or more, and is 1.05 time by mole or less, more preferably 1.04 time by mole or less, based on 4,4'-biphenol. When the amount is 1.05 time by mole or more, there is a tendency that the obtained aromatic polyether has a lower molecular weight, hence not preferable.

The amount of diphenyl sulfone to be used in the present invention is usually 0.1 time by mass or more and 10 times by mass or less, and is preferably 0.5 time by mass or more and 3 times by mass or less, based on the total amount of 4,4'-biphenol and 4,4'-dihalogenodiphenyl sulfone.

Examples of the alkali metal carbonate or an alkali metal bicarbonate include potassium carbonate, sodium carbonate, potassium bicarbonate, sodium bicarbonate and the like, and usually potassium carbonate is used. The amount of the alkali metal carbonate and/or an alkali metal bicarbonate to be used is usually 1 time by mole or more and 1.2 time by mole or less based on 4,4'-biphenol. The amount of 1.05 time by mole or more is preferred, and 1.08 time by mole or more is more preferred, in view of transparency of the produced aromatic polyethers.

Usually, a powdered alkali metal carbonate and/or an alkali metal bicarbonate is used in the process of the present invention, since it gives superior transparency.

The temperature for polymerization in the process of the present invention is not lower than 240° C. and not higher than 270° C., and it is preferred to conduct the polymerization at 255° C. or lower in view of transparency of the produced aromatic polyethers. When the temperature is 240° C. or more, there is a tendency of increasing polymerization rate. When the temperature is 270° C. or less, there is a tendency that the obtained aromatic polyether has a smaller dispersion of molecular weight.

When the temperature for polymerization is 255° C. or lower, it is preferred that the amount of the alkali metal carbonate and/or an alkali metal bicarbonate to be used is 1.06 time by mole or more based on 4,4'-biphenol in view of transparency of the obtained aromatic polyether.

For polymerization, for example, 4,4'-biphenol, a 4,4'-dihalogenodiphenyl sulfone, diphenyl sulfone and an alkali metal carbonate may be mixed and heated to the polymerization temperature. The reaction period is usually 3 hours or more and 20 hours or less.

In order to improve transparency of the produced aromatic polyethers, it is preferred that the polymerization is conducted in the presence of hypophosphorous acid and/or its alkali metal salts. Examples of hypophosphorous acid and its alkali metal salts include hypophosphorous acid, potassium hypophosphite, sodium hypophosphite, and the like. Among them, hypophosphorous acid is more preferred.

The amount of hypophosphorous acid and/or its alkali metal salts is usually about 0.001 time by mole and not exceeding about 0.006 time by mole, preferably about 0.0015 time by mole and not exceeding about 0.004 time by mole, based on said 4,4'-biphenol. When the amount is in the above range, there is a tendency that transparency of the produced aromatic polyester improves.

The hypophosphorous acid and/or its alkali metal salts need to present at the polymerization. The hypophosphorous acid and/or its alkali metal salts may be added as a mixture with 4,4'-biphenol, as a mixture with 4,4'-dihalogenodiphenyl sulfone, or as a mixture with diphenyl sulfone. Alternatively, it may be added during the polymerization.

For isolating the aromatic polyethers from the reaction mixture after the reaction, for example, the reaction mixture after the reaction may be solidified, powdered and washed with a solvent. The solidification of the reaction mixture after the reaction may be performed by cooling, and the cooling around the room temperature can result the solidification. The powdering of the solidified reaction mixture may be preformed by pulverization of the reaction mixture. As to the solvent for washing, solvents which do not dissolve the aromatic polyether but can dissolve diphenyl sulfone and the alkali metal halide which is produced by polimerization are used. Examples of usable solvents include water; aliphatic ketones such as acetone, methyl ethyl ketone and the like; aliphatic alcohols such as methanol, ethanol, isopropanol and the like as well as mixture thereof.

The invention will now be described in more detail with reference to Examples, which should not be construed as a limitation upon the scope of the invention. In the following examples, "part" is weight basis, unless otherwise stated.

EXAMPLE 1

Into a reaction vessel equipped with a stirrer, a nitrogen gas inlet tube, a thermometer and a condenser were placed 81.93 parts of 4,4'-biphenol (powder), 130.65 parts of 4,4'-dichlorodiphenyl sulfone (powder) and 193.12 parts of diphenyl sulfone (powder). They were heated to 170° C. while flowing nitrogen gas. The contents became a slurry at the same temperature. Then, with a stream of nitrogen gas and stirring of the slurry, 67.5 parts of potassium carbonate (particle size of 150 $\mu$m or smaller: 97.3–99.6%, particle size of 75–150 $\mu$m: 1.2–8.4%, particle size of 45–75 $\mu$m: 3.9–55.7%, particle size of 45 $\mu$m or smaller: 38.0–92.9%; Manufactured by Nippon Soda.) was added, and the mixture was heated to a polymerization temperature (248° C.) over 2.5 hours. The stirring was continued for 10 hours at the same temperature with a stream of nitrogen gas. Thereafter, the mixture was cooled to room temperature. Upon solidification, the reaction mixture was pulverized, repeatedly washed with a mixed solvent consisting of water, acetone and methanol, and dried at 150° C. to give an aromatic polyether.

[Evaluation]

The polyether obtained in the above Example 1 was evaluated by the following method. The results are shown in Table 2.

(1) Molecular Weight

Weight average molecular weight (Mw) was determined by gel permeation chromatography.

Apparatus for gel permeation chromatography was "150_C plus" (manufactured by Waters).

Two columns "TSK gel GMHHR-H column" (manufactured by Tosoh) connected in series were used for separation.

Solution for elution was dimethylformamide flown at 1 cm$^3$/minute.

Detector was RI detector (refractometer).

Standard substance was monodisperse standard polystyrene.

(2) Dispersion of Molecular Weight

Number average molecular weight (Mn) was measured by gel permeation chromatography in the same manner as that described above, and the dispersion of molecular weight was obtained as a ratio (Mw/Mn) of the weight average molecular weight (Mw) and the number average molecular weight (Mn). The smaller is the ratio (Mw/Mn), the smaller is the distribution of molecular weight.

(3) Transparency

Transmittance (T400) at 400 nm and chromaticity coordinates, x and y were measured with a spectrophotometer UV-2400PC(cell length: 100 mm=3.937 inches, manufactured by Shimadzu Co.) for a solution of 5.56 g of an aromatic polysulfone dissolved in 100 cm$^3$ of N-methylpyrrolidinone (0.0556 g/ml) which was filtered with a filter having pore diameter of 0.45 µm.

Color tone (Yellowness) of the solution is represented by Solution Color Factor (S.C.F.) of the following formula.

$$(S.C.F.)=[\{(x+y)-0.6275\}\cdot 270]/(3.937 \cdot 0.0556)$$

(4) Impact Strength Test

A test piece of the aromatic polyether having 64 mm-length, 12.7 mm-width, 3.2 mm-thickness and a notch having the radius at the end of 0.25 mm and the depth of 1.3 mm is produced with a injection molding machine. Impact strength is measured with the test piece according to ASTM D256.

EXAMPLES 2–12 AND COMPARATIVE EXAMPLES 1–3

According to the same manner as in Example 1, except that amounts (molar ration) of 4,4'-dichlorodiphenyl sulfone and potassium carbonate and the polymerization temperature were changed as shown in Table 1, an aromatic polyether was obtained. The polyether thus obtained was evaluated according to the same manner as in Example 1. The results are shown in Table 2.

EXAMPLE 13

According to the same manner as in Example 1, except that amounts (molar ration) of 4,4'-dichlorodiphenyl sulfone and potassium carbonate and the polymerization temperature were changed as shown in Table 1 and hypophosphorous acid (30% aqueous solution) in an amount of 0.002 mole per 1 mole of 4,4'-biphenol was added, an aromatic polyether was obtained. The polyether thus obtained was evaluated according to the same manner as in Example 1. The results are shown in Table 2.

TABLE 1

|  | polymerization temperature (° C.) | Molar ratio *1 of 4,4'-dichlorodiphenyl sulfone | Molar ratio *2 of potassium carbonate |
|---|---|---|---|
| Example 1 | 248 | 1.034 | 1.11 |
| Example 2 | 257 | 1.034 | 1.11 |
| Example 3 | 260 | 1.034 | 1.09 |
| Example 4 | 263 | 1.034 | 1.07 |
| Example 5 | 260 | 1.034 | 1.07 |
| Example 6 | 247 | 1.034 | 1.07 |
| Example 7 | 264 | 1.034 | 1.05 |
| Example 8 | 263 | 1.034 | 1.04 |
| Example 9 | 257 | 1.034 | 1.05 |
| Example 10 | 252 | 1.032 | 1.07 |
| Example 11 | 250 | 1.032 | 1.07 |
| Example 12 | 253 | 1.028 | 1.07 |
| Example 13 *3 | 257 | 1.025 | 1.07 |
| Comparative example 1 | 274 | 1.034 | 1.04 |
| Comparative example 2 | 280 | 1.036 | 1.045 |
| Comparative example 3 | 291 | 1.032 | 1.07 |

*1: Molar ratio of used 4,4'-dichlorodiphenyl sulfone based on 4,4'-biphenol.
*2: Molar ratio of used amounts based on the amount of used 4,4'-biphenol.
*3: hypophosphorous acid was added.

TABLE 2

|  | Mw | Mw/Mn | T400 (%) | S.C.F. | Impact strength |
|---|---|---|---|---|---|
| Example 1 | 54800 | 2.28 | 57 | 49 |  |
| Example 2 | 56800 | 2.31 | 60 | 48 |  |
| Example 3 | 56800 | 2.44 | 60 | 47 |  |
| Example 4 | 52600 | 2.41 | 61 | 44 |  |
| Example 5 | 49700 | 2.21 | 58 | 49 |  |
| Example 6 | 54400 | 2.29 | 67 | 36 |  |
| Example 7 | 59100 | 2.47 | 50 | 64 |  |
| Example 8 | 58900 | 2.51 | 51 | 59 |  |
| Example 9 | 54800 | 2.45 | 48 | 63 |  |
| Example 10 | 57900 | 2.38 | 65 | 37 | 496 |
| Example 11 | 56200 | 2.22 | 59 | 45 |  |
| Example 12 | 61200 | 2.37 | 62 | 41 | 624 |
| Example 13 | 64100 | 2.26 | 74 | 23 |  |
| Comparative example 1 | 55900 | 2.55 | 49 | 68 | — |
| Comparative example 2 | 60300 | 2.73 | 13 | 121 | 252 |
| Comparative example 3 | 57900 | 2.66 | — | — | 155 |

*1: Amount of used 4,4'-dichlorodiphenyl sulfone based on 4,4'-biphenol (ratio of amounts of substances).
*2: Ratio of used amounts based on the amount of used 4,4'-biphenol (ratio of amounts of substances).

The aromatic polyethers obtainable according to the process of the present invention have a high molecular weight, for example, as high as 35,000 or more in the weight average molecular weight (Mw) and a small dispersion of the molecular weight. They are excellent in the heat resistance as well as the impact resistance.

When the process of the present invention is conducted in the presence of hypophosphorous acid and/or its alkali metal salts in an amount exceeding 0.01 time by mole and not exceeding 0.06 time by mole based on said 4,4'-biphenol, aromatic polyethers having excellent transparency can be obtained.

What is claimed is:

1. A process for producing an aromatic polyether represented by the formula (1):

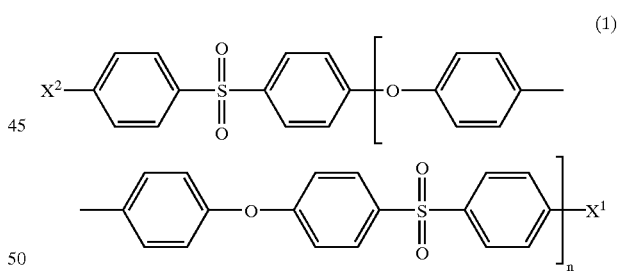

(1)

wherein each of $x^1$ and $x^2$ independently represents a halogen, and n represents an integer of 1 or above, which comprises polymerizing 4,4'-biphenol with a 4,4'-dihalogenodiphenyl sulfone represented by the formula (2):

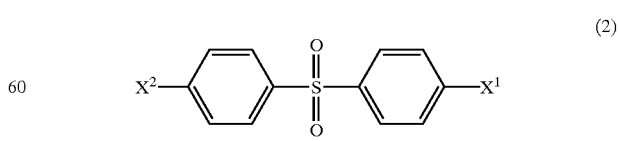

(2)

wherein $x^1$ and $x^2$ have the same meaning as above, in an amount exceeding 1 time by mole and not exceeding 1.05 time by mole based on said 4,4'-biphenol in diphenyl sulfone and in the presence of an alkali metal carbonate and/or an alkali metal bicarbonate at a temperature which is not lower than 240° C. and not higher than 270° C.

2. The process according to claim 1, wherein the amount of the alkali metal carbonate and/or an alkali metal bicarbonate is 1.08 time by mole or more based on the amount of 4,4'-biphenol.

3. The process according to claim 1, wherein the temperature for polymerization is 240° C. or higher and 255° C. or lower and the amount of the alkali metal carbonate and/or an alkali metal bicarbonate is 1.06 time by mole or more based on the amount of 4,4'-biphenol.

4. The process according to claim 1, which is conducted in the presence of hypophosphorous acid and/or its alkali metal salts in an amount exceeding 0.001 time by mole and not exceeding 0.006 time by mole based on the 4,4'-biphenol.

* * * * *